(12) United States Patent
Lange et al.

(10) Patent No.: US 7,750,193 B2
(45) Date of Patent: Jul. 6, 2010

(54) METHOD FOR PRODUCING POLYISOBUTENYLPHENOLS

(75) Inventors: Arno Lange, Bad Duerkheim (DE); Helmut Mach, Heidelberg (DE); Hans Peter Rath, Gruenstadt (DE); Dietmar Posselt, Heidelberg (DE); Anja Vinckier, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1004 days.

(21) Appl. No.: 10/587,747

(22) PCT Filed: Feb. 1, 2005

(86) PCT No.: PCT/EP2005/000986

§ 371 (c)(1),
(2), (4) Date: Jul. 28, 2006

(87) PCT Pub. No.: WO2005/073152

PCT Pub. Date: Aug. 11, 2005

(65) Prior Publication Data

US 2009/0025284 A1 Jan. 29, 2009

(30) Foreign Application Priority Data

Feb. 2, 2004 (DE) .................... 10 2004 005 108

(51) Int. Cl.
*C07C 37/14* (2006.01)
(52) U.S. Cl. ............... 568/792; 568/790; 564/336; 564/384
(58) Field of Classification Search .......... 585/465; 44/450; 568/790, 792, 793, 799; 524/164; 525/534
See application file for complete search history.

(56) References Cited

U.S. PATENT DOCUMENTS

| 3,360,464 A | 12/1967 | Otto, Jr. |
| 3,449,444 A | 6/1969 | Habibi |
| 3,878,255 A * | 4/1975 | Norell .................... 568/783 |
| 4,238,628 A | 12/1980 | Cahill et al. |
| 4,429,099 A | 1/1984 | Kennedy et al. |
| 4,605,808 A * | 8/1986 | Samson .................. 585/525 |
| 4,663,063 A * | 5/1987 | Davis .................... 508/454 |
| 5,300,701 A | 4/1994 | Cherpeck et al. |
| 5,620,949 A * | 4/1997 | Baker et al. ............ 508/452 |
| 6,875,897 B1 * | 4/2005 | Lange et al. ........... 568/792 |
| 6,914,163 B2 * | 7/2005 | Lange et al. ........... 568/792 |

FOREIGN PATENT DOCUMENTS

| DE | 199 48 111 | 4/2001 |
| FR | 2 548 194 | 1/1985 |
| GB | 497 721 | 12/1938 |
| GB | 758 474 | 10/1956 |
| GB | 795 574 | 5/1958 |
| GB | 1 020 460 | 2/1966 |
| GB | 1 159 368 | 7/1969 |
| GB | 1 212 462 | 11/1970 |
| WO | 94/14739 | 7/1994 |
| WO | 01/25293 | 4/2001 |
| WO | 01/25294 | 4/2001 |
| WO | 02/26839 | 4/2002 |
| WO | 02/26840 | 4/2002 |
| WO | WO 0226839 A2 * | 4/2002 |
| WO | WO 0226840 A2 * | 4/2002 |
| WO | 03/106595 | 12/2003 |

OTHER PUBLICATIONS

Urban, Frank J. et al., "Lipophilic 1, 3-Xylyl-21-crown-6 Macrocyclic Polyether 2-Carboxylic Acids as Biological Mimics of the Ionophore Antibiotics", J. Med. Chem., vol. 33, No. 2, pp. 765-771, 1990.
Ingold, K. U., "Inhibition of oil oxidation by 2, 6-DI-t-Butyl-4-Substituted Phenols", J. Phys. Chem., vol. 64, pp. 1636-1642, 1960.
Kennedy, J. P. et al., "New Telechelic Polymers and Sequential Copolymers by Polyfunctional Initiator-Transfer Agents (Inifers) 27. Bisphenol- and Trisphenol-Polyisobutylenes", Polymer Bulletin, vol. 8, pp. 563-570, 1982.

* cited by examiner

*Primary Examiner*—Ellen M McAvoy
*Assistant Examiner*—Pamela Weiss
(74) *Attorney, Agent, or Firm*—Oblon, Spivak, McClelland, Maier & Neustadt, L.L.P.

(57) ABSTRACT

The present invention relates to a process for preparing 2-alkylpolyisobutenylphenols and their Mannich adducts, to compositions obtainable by this process and to their use.

11 Claims, No Drawings

METHOD FOR PRODUCING POLYISOBUTENYLPHENOLS

The present invention relates to a process for preparing 2-alkylpolyisobutenylphenols and their Mannich adducts, to compositions obtainable by this process and to their use.

It is known that hydroxyaromatic compounds can be alkylated with polyolefins using acidic catalysts to prepare polyalkenylphenols. This Friedel-Crafts alkylation generally leads to mixtures of alkylation products, since the alkylated products are more reactive than the unsubstituted starting products. In addition, when higher molecular weight alkylating agents are used, fragmentation reactions frequently occur both on the polyolefin and on the alkylated product, so that a product mixture of complex composition is generally obtained.

For many industrial applications, such mixtures are unsuitable. Rather, products of defined composition which have polyolefin substitution in defined positions are required. To achieve the desired product properties, further substituents of the aromatic are additionally required in many cases, for example low molecular weight alkyl radicals, and both their type and their position may be relevant. There is therefore a need for processes which enable the preparation of polyisobutenylphenols which are additionally substituted in the 2-position and/or further positions of the aromatic (based on the OH group).

GB-A-1 159 368 discloses the alkylation of phenol with monoolefinic polymeric alkylating agents having molecular weights of from 700 to 300 000 using boron trifluoridephenoxide as a catalyst, which can be generated in situ by introducing $BF_3$ gas into the reaction mixture.

U.S. Pat. No. 4,238,628 discloses a process for alkylating benzene, phenol and naphthol with polyolefins composed of monomers having at least three carbon atoms, preferably polybutene, in the presence of boron trifluoride as a catalyst. Before the alkylation reaction, the olefin polymer has to be reacted with ethylene in order to obtain substantial ethylene termination. The yield of alkylphenol is only from 44 to 64%.

U.S. Pat. No. 4,429,099 discloses the alkylation of phenol or substituted phenols with bis(polyisobutene)benzene or tris(polyisobutene)benzene having molecular weights of from approx. 700 to 50 000 or from approx. 1000 to 75 000. Some of the catalysts disclosed are $BF_3$ and $BF_3O(C_2H_5)_2$.

WO-A-94/14739 teaches a process for preparing polyisobutenylhydroxyaromatics. In the process, a hydroxyaromatic compound is reacted with a polyisobutene (PIB) having a number-average molecular weight of from 300 to 5000 and comprising at least 70% vinylidene termination (α-olefin) in the presence of an acidic alkylation catalyst. The suitable alkylation catalysts mentioned are Lewis acids in a quite general sense, trifluoromethanesulfonic acid and acidic molecular sieves. Specifically, in addition to trifluoromethanesulfonic acid, the $BF_3$ complexes with diethyl ether, phosphoric acid and phenol are used.

Kennedy, Guhaniyogi and Percec (Polym. Bull. 8, 563 (1970)) teach the use of $BF_3$-diethyl etherate as an alkylation catalyst, and the PIB:phenol ratio is 1:2.5 or 1:1.7 (based in each case on the polyisobutenyl end groups).

WO 01/25293 and WO 01/25294 describe processes for preparing polyisobutenephenol-containing Mannich adducts by alkylation of an aromatic hydroxyl compound with highly reactive polyisobutene at a temperature below 50° C. in the presence of an alkylation catalyst and reacting the thus obtained alkylation product with a formaldehyde source and at least one amine in a Mannich reaction. Suitable alkylation catalysts which are mentioned are generally protic acids and Lewis acids, including adducts of boron trifluoride with $C_1$-$C_6$-alkanols, phenols or ethers.

WO 03/106595 describes an additive concentrate for turbine fuels, which, in addition to a multitude of further components, may also comprise a Mannich adduct composed of a hydrocarbon-substituted phenol, an aldehyde and an amine.

WO 02/26839 describes a process for preparing polyisobutenylphenols by alkylating an aromatic hydroxyl compound with polyisobutenes in the presence of a Lewis-acidic alkylation catalyst, in which an ether is additionally used as a cocatalyst and, in the case of $BF_3$ as the Lewis acid, has a molecular weight of at least 102 g/mol.

WO 02/26840 describes a process for preparing polyisobutenylphenols by alkylating an aromatic hydroxyl compound with polyisobutenes in the presence of a Lewis-acidic alkylation catalyst, in which at least 35 mol % of the polyisobutenes have a double bond in the β-position.

It is an object of the present invention to provide a process for alkylating substituted phenols with polyisobutenes. The process should be suitable especially for alkylating phenols which have an alkyl substituent in the 2-position, and also optionally further substituents, especially in the 6-position. In the alkylating reaction, there should preferably be substantially no fragmentation reactions of the polyisobutene or of the substituted phenol used. The process should also be especially suitable for alkylating phenols which have a branched alkyl substituent such as isobutyl or tert-butyl in the 2-position and/or 6-position.

It has now been found that, surprisingly, this object is achieved by an alkylation process in which a suitable $BF_3$ source which is capable of complex formation with the 2-alkylphenol compound used as a reactant is used as an alkylation catalyst.

The present invention provides a process for preparing 2-alkylpolyisobutenylphenols and their Mannich adducts, by a) contacting at least one 2-alkylhydroxyaromatic compound with a catalytically active amount of a $BF_3$ source which is capable of complex formation with the 2-alkylhydroxy compound, and alkylating with substantially monoethylenically unsaturated and substantially homopolymeric polyisobutenes, b) if appropriate, subjecting the 2-alkylpolyisobutenylphenols obtained in step a) to an aminoalkylation.

Catalysts whose use is not in accordance with the invention are:

$BF_3$ complexes with aliphatic ethers such as dialkyl ethers (e.g. diethyl ether), dicycloalkyl ethers (e.g. dicyclohexyl ether) and tetrahydrofuran, $BF_3$ complexes with phenol and aryl alkyl ethers (e.g. anisole), $BF_3$ complexes with aliphatic alcohols which comprise at least 2 mol of alcohol per mole of $BF_3$.

The process according to the invention enables the polyisobutene alkylation of phenols which already have an alkyl substituent in the 2-position and also if appropriate further substituents, especially in the 6-position. This allows the disadvantages occurring in the polyisobutene alkylation of such phenols by processes known from the prior art to be substantially avoided. For instance, substantially no fragmentation reactions of the polyisobutene or of the substituted phenol used are observed in the alkylation reaction. The polyisobutene used as a reactant can be used with high conversions to the alkylation. The alkylation of the cocatalyst which occurs as an undesired side reaction when $BF_3$ complexes with phenol and aryl alkyl ethers are used as cocatalysts is avoided. In addition, the process according to the invention is also suitable for alkylating phenols which have, in the 2-position and/or 6-position, a branched alkyl substituent such as isobutyl or tert-butyl. In the polyisobutene alkylation of such phenols by processes known from the prior art, there is generally partial or complete elimination of the branched alkyl substituents.

For the purpose of illustrating the present invention, the term "alkyl" comprises straight-chain and branched alkyl groups. It is preferably straight-chain or branched $C_1$-$C_{20}$-alkyl, more preferably $C_1$-$C_{10}$-alkyl, particularly preferably $C_1$-$C_8$-alkyl and very particularly preferably $C_1$-$C_4$-alkyl groups. Examples of alkyl groups are in particular methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, 2-ethylhexyl, 2-propylheptyl, nonyl, decyl.

The term "alkyl" also comprises substituted alkyl groups which generally have 1 2, 3, 4 or 5, preferably 1, 2 or 3, substituent(s), and more preferably 1 substituent. These are preferably selected from cycloalkyl, aryl, heteroaryl, halogen, amino, alkoxycarbonyl, acyl, nitro, aminocarbonyl, alkylaminocarbonyl, dialkylaminocarbonyl, alkylcarbonylamino, carboxylate and sulfonate.

In the context of the present invention, the term "cycloalkyl" comprises unsubstituted and substituted cycloalkyl groups, preferably $C_5$-$C_7$-cycloalkyl groups such as cyclopentyl, cyclohexyl or cycloheptyl. In the case of a substitution, these may bear generally 1, 2, 3, 4 or 5, preferably 1, 2 or 3, substituent(s). These substituents are selected, for example, from alkyl and the substituents mentioned above for substituted alkyl groups.

In the context of the present invention, the term "aryl" comprises unsubstituted and substituted aryl groups, and is preferably phenyl, tolyl, xylyl, mesityl, naphthyl, fluorenyl, anthracenyl, phenanthrenyl or naphthacenyl, more preferably phenyl or naphthyl. In the case of a substitution, these aryl groups may bear generally 1, 2, 3, 4 or 5, preferably 1, 2 or 3, substituent(s). These substituents are selected, for example, from alkyl and the substituents mentioned above for substituted alkyl groups.

In the context of the present invention, the term "heteroaryl" comprises unsubstituted or substituted, heterocycloaromatic groups, preferably the pyridyl, quinolinyl, acridinyl, pyridazinyl, pyrimidinyl, pyrazinyl, pyrrolyl, imidazolyl, pyrazolyl, indolyl, purinyl, indazolyl, benzotriazolyl, 1,2,3-triazolyl, 1,3,4-triazolyl and carbazolyl groups. In the case of a substitution, these heterocycloaromatic groups may bear generally 1, 2 or 3 substituent(s). These substituents are selected, for example, from alkyl and the substituents mentioned above for substituted alkyl groups.

In the context of this invention, carboxylate and sulfonate preferably represent a derivative of a carboxylic acid function and of a sulfonic acid function respectively, especially a metal carboxylate or sulfonate, a carboxylic ester or sulfonic ester function or a carboxamide or sulfonamide function. These include, for example, the esters with $C_1$-$C_4$-alkanols such as methanol, ethanol, n-propanol, isopropanol, n-butanol, sec-butanol and tert-butanol.

In the context of the present invention, the term "acyl" represents alkanoyl or aroyl groups having generally from 2 to 11, preferably from 2 to 8, carbon atoms, for example the acetyl, propanoyl, butanoyl, pentanoyl, hexanoyl, heptanoyl, 2-ethylhexanoyl, 2-propylheptanoyl, benzoyl or naphthoyl group.

Halogen represents fluorine, chlorine, bromine and iodine, preferably fluorine, chlorine and bromine.

The $BF_3$ source used in step a) is preferably selected from:
i) gaseous $BF_3$,
ii) $BF_3$ complexes with at least one of the 2-alkylhydroxyaromatic compounds used in step a),
iii) $BF_3$ complexes with hydroxyaromatic compounds which are substantially not alkylated under the reaction conditions in step a), and
iv) mixtures of $BF_3$ with aliphatic alcohols which comprise less than 2 mol of alcohol per mole of $BF_3$.

In the aforementioned embodiment i), the alkylation catalyst is formed in situ from the 2-alkylhydroxyaromatic compound used as a reactant and $BF_3$. To this end, the hydroxyaromatic compound may be initially charged in a reaction zone in substance or preferably in solution and the gaseous $BF_3$ subsequently added.

In the aforementioned embodiment ii), the alkylation catalyst is formed beforehand separately from at least one 2-alkylhydroxyaromatic compound used as a reactant and a $BF_3$ source. Suitable $BF_3$ sources in this version are gaseous $BF_3$ and $BF_3$ complexes having a lower complex formation constant than for the $BF_3$ complex with the 2-alkylhydroxyaromatic compound used as a reactant.

In the aforementioned embodiment iii), the $BF_3$ source used is at least one $BF_3$ complex with a hydroxyaromatic compound which is substantially not alkylated under the reaction conditions in step a). These include substituted phenols which have substituents other than hydrogen in the 2-, 4- and 6-position to the OH group, preferably 2,4,6-trialkylphenols such as 2,4,6-trimethylphenol. These also include substituted phenols which, in addition to the OH and alkyl group, have at least one further, reactivity-lowering substituent such as acyl, carboxyl, cyano, nitro and especially halogen. Suitable are, for example, 2-alkylphenols which have, in the 4-position to the phenol group, a further, reactivity-lowering substituent. Preference is given to halophenols, in particular 2-chlorophenol, 4-chlorophenol and 2,4-dichlorophenol.

In the aforementioned embodiment iv), the $BF_3$ source used is a mixture of $BF_3$ with at least one aliphatic alcohol in a molar ratio of alcohol to $BF_3$ of less than 2:1. The molar ratio of alcohol to $BF_3$ is preferably at most 1.9:1, more preferably at most 1.5:1, in particular at most 1.1:1.

The aliphatic alcohol is preferably selected from $C_1$-$C_4$-alkanols such as methanol, ethanol, n-propanol, isopropanol, n-butanol, sec-butanol and tert-butanol. Particular preference is given to using methanol.

The polyisobutene used for alkylation in step a) preferably has a number-average molecular weight $M_n$ of at least 100. Preference is given to polyisobutenes having a number-average molecular weight $M_n$ in the range from 100 to 500 000, particularly preferably from 120 to 20000, more preferably from 150 to 5000 and in particular from 200 to 1000. In the context of the present invention, the term "polyisobutene" also includes oligomeric isobutenes such as dimeric, trimeric, tetrameric, pentameric, hexameric and heptameric isobutene.

The polyisobutene used in the alkylation reaction may in principle be any common and commercially available polyisobutene.

For the alkylation in step a), preference is given to using a "reactive" polyisobutene. "Reactive" polyisobutenes differ from the "low-reactivity" polyisobutenes by the content of terminal double bonds. Thus, reactive polyisobutenes comprise at least 50 mol %, based on the total number of polyisobutene macromolecules, of terminal double bonds. Particular preference is given to polyisobutenes having at least 60 mol % and in particular having at least 80 mol %, based on the total number of polyisobutene macromolecules, of terminal double bonds. The terminal double bonds may be either vinyl double bonds [—CH=C(CH$_3$)$_2$] (β-olefin) or vinylidene double bonds [—CH—C(=CH$_2$)—CH$_3$] (α-olefin). Also used for the alkylation are substantially homopolymeric polyisobutenes which have uniform polymer structures. In the context of the present invention, this refers to those polyisobutenes which are composed of at least 85% by weight, preferably of at least 90% by weight and more preferably of at least 95% by weight, of isobutene units [—CH$_2$C(CH$_3$)$_2$—].

In addition, the polyisobutenes used in step a) preferably have a polydispersity index (PDI) of from 1.05 to 10. Polydispersity refers to the quotient of weight-average molecular weight $M_w$ and number-average molecular weight $M_n$ (PDI=$M_w/M_n$). The selection of the polyisobutenes having a certain PDI which are used for the alkylation is determined by the intended use of the alkylation products or their Mannich adducts. In general, the PDI value for a given Mn correlates with the viscosity. Accordingly, for applications in which easy miscibility or processibility with the application medium and thus a low viscosity is required, a polyisobutene having a PDI of preferably at most 3.0 is selected. In contrast, for surface modifications in the form of coatings, a higher viscosity is frequently desired, so that in this case preference is given to polyisobutenes having a PDI in the range from 1.5 to 10.

2-Alkylpolyisobutenylphenols having polyisobutene radicals having a narrow molecular weight distribution (PDI from about 1.05 to about 3.0, preferably from about 1.05 to about 2.0) of the polyisobutene radical are suitable, for example, for use as a detergent or dispersant in fuel and lubricant compositions, as an additive in pressure systems, in polymers or in monolayers for hydrophobicization. 2-Alkylpolyisobutenylphenols having polyisobutene radicals having an average molecular weight distribution (PDI from about 1.6 to about 2.5) are suitable, for example, for use in emulsions or dispersions, and also for hydrophobicizing basic materials such as calcium carbonate (for example in the form of mortar), gypsum or cement, whereas those having a broad molecular weight distribution (PDI of the polyisobutene radical from about 2.1 to about 10) are suitable for use as corrosion inhibitors or likewise for hydrophobicizing basic materials.

In the context of the present invention, polyisobutenes also refer to all polymers obtainable by cationic polymerization which preferably comprise at least 60% by weight of isobutene, particularly preferably at least 80% by weight, more preferably at least 90% by weight and in particular at least 95% by weight, of copolymerized isobutene. In addition, the polyisobutenes may comprise further copolymerized butene isomers such as 1- or 2-butene, and also different olefinically unsaturated monomers which are copolymerizable with isobutene under cationic polymerization conditions.

Suitable isobutene feedstocks for the preparation of polyisobutenes which are suitable as reactants for the process according to the invention are accordingly both isobutene itself and isobutenic C$_4$ hydrocarbon streams, for example C$_4$ raffinates, C$_4$ cuts from isobutene dehydrogenation, C$_4$ cuts from steamcrackers, FCC crackers (FCC: Fluid Catalyzed Cracking), as long as they have been substantially freed of 1,3-butadiene comprised therein. Particularly suitable C$_4$ hydrocarbon streams generally comprise less than 500 ppm, preferably less than 200 ppm, of butadiene. When C$_4$ cuts are used as the starting material, the hydrocarbons other than isobutene assume the role of an inert solvent.

Useful copolymerizable monomers include vinylaromatics such as styrene and α-methylstyrene, C$_1$-C$_4$-alkylstyrenes such as 2-, 3- and 4-methylstyrene, and also 4-tert-butylstyrene, isoolefins having from 5 to 10 carbon atoms such as 2-methylbutene-1, 2-methylpentene-1, 2-methylhexene-1, 2-ethylpentene-1, 2-ethylhexene-1 and 2-propylheptene-1. Useful comonomers are also olefins which have a silyl group such as 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri(methoxyethoxy)silyl]-2-methylpropene-2.

Suitable polyisobutenes are all polyisobutenes obtainable by common cationic or living cationic polymerization. However, preference is given to "reactive" polyisobutenes which have already been described above.

Suitable polyisobutenes are, for example, the Glissopal brands from BASF Aktienge-sellschaft, for example Glissopal 550, Glissopal 1000 and Glissopal 2300, and also the Oppanol brands from BASF Aktiengesellschaft such as Oppanol B10, B12 and B15.

Processes for preparing suitable polyisobutenes are known, for example, from DE-A 27 02 604, EP-A 145 235, EP-A 481 297, EP-A 671 419, EP-A 628 575, EP-A 807 641 and WO 99/31151. Polyisobutenes which are prepared by living cationic polymerization of isobutene or isobutenic monomer mixtures are described, for example, in U.S. Pat. No. 4,946,899, U.S. Pat. No. 4,327,201, U.S. Pat. No. 5,169,914, EP-A 206 756, EP-A 265 053, WO 02/48216 and in J. P. Kennedy, B. Ivan, "Designed Polymers by Carbocationic Macromolecular Engineering", Oxford University Press, New York 1991. These and other publications which describe polyisobutenes are fully incorporated herein by way of reference.

Depending on the polymerization process, the polydispersity index (PDI=$M_w/M_n$) of the resultant polyisobutenes is from about 1.05 to 10. Polymers from living cationic polymerization generally have a PDI of from about 1.05 to 2.0. The molecular weight distribution of the polyisobutenes used in the process according to the invention has a direct effect on the molecular weight distribution of the 2-alkylpolyisobutenylphenols. As already stated, polyisobutenes having a low, an average or a broad molecular weight distribution are selected for the alkylation depending on the intended use.

The 2-alkylhydroxyaromatic compound used for the alkylation in step a) is preferably selected from phenolic compounds which, in addition to the OH group and the alkyl group, may also have at least one further substituent. Suitable further substituents are, for example, alkyl, hydroxyl, polyalkylene oxide and polyalkylnimine. The 2-alkylhydroxyaromatic compound used for the alkylation in step a) is more preferably selected from compounds of the general formula I

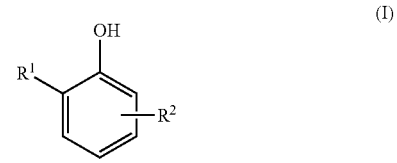

where
R$^1$ is C$_1$-C$_{20}$-alkyl and
R$^2$ is hydrogen, C$_1$-C$_{20}$-alkyl, hydroxyl or C$_2$-C$_{4000}$-alkyl which is interrupted by at least one moiety which is selected from O, S and NR$^3$ where R$^3$ is hydrogen, alkyl, cycloalkyl or aryl.

In a preferred embodiment, the R$^2$ radical is hydrogen. In a further preferred embodiment, the R$^2$ radical is a radical other than hydrogen which is bonded to the benzene ring in the 6-position. In that case, $R^2$ is preferably an alkyl radical as defined at the outset.

Preferred compounds of the formula I are o-cresol, 2-ethylphenol, 2-(n-propyl)phenol, 2-(n-butyl)phenol, 2,3-, 2,4-, 2,5- and 2,6-dimethylphenol, 2,3-, 2,4-, 2,5- and 2,6-diethylphenol, 2,3-, 2,4-, 2,5- and 2,6-di(n-propyl)phenol, 2,3-, 2,4-, 2,5- and 2,6-di(n-butyl)phenol.

The process according to the invention is especially suitable for alkylating phenols which have a branched alkyl substituent in the 2-position and/or 6-position. These preferably include 2-alkylhydroxy compounds of the general formula I where $R^1$ and/or $R^2$ are each a $C_1$-$C_{20}$-alkyl radical which has at least one tertiary or quaternary carbon atom. Suitable $C_1$-$C_{20}$-alkyl radicals which have at least one tertiary or quaternary carbon atom are isopropyl, 2-butyl, sec-butyl, tert-butyl, 2-pentyl, 2-methylbutyl, 3-methylbutyl, 1,2-dimethylpropyl, 1,1-dimethylpropyl, 2,2-dimethylpropyl, 1-ethylpropyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl- 2-methylpropyl, 2-heptyl, 3-heptyl, 2-ethylpentyl, 1-propylbutyl, 2-ethylhexyl, 2-propylheptyl, etc. Preferred $C_1$-$C_{20}$-alkyl radicals are isopropyl and tert-butyl.

Preferred phenols which have a branched alkyl substituent in the 2-position and/or 6-position are 2-isopropylphenol, 2-(tert-butyl)phenol, 2,6-diisopropylphenol and 2,6-di(tert-butyl)phenol.

Advantageously, the process according to the invention enables the substantially selective polyisobutene monoalkylation of the 2-alkylhydroxyaromatic compound used for the alkylation in step a). In the process according to the invention, 2-alkylpolyisobutenylphenols are generally obtained, of which (when the reactant used permits polyalkylations) at most 20 mol %, preferably at most 10 mol %, in particular at most 5 mol %, has been alkylated more than once with the polyisobutene. From the aforementioned preferred phenols which have an alkyl substituent in the 2-position and/or 6-position, compounds alkylated with polyisobutene in the 4-position are obtained substantially selectively.

Advantageously, the process according to the invention enables the substantially selective polyisobutene alkylation without large excesses of the 2-alkylhydroxyaromatic compound having to be used. Preference is given to using 2-alkylhydroxyaromatic compound and polyalkenes in a molar ratio of from 5:1 to 1:1, more preferably from 2.5:1 to 1:1, more preferably from 2:1 to 1:1. However, it will be appreciated that an excess of the 2-alkylhydroxyaromatic compound of 100% and more is also suitable. The molar amount of 2-alkylhydroxyaromatic compound is understood as being the amount which is effectively available for alkylation (i.e. minus the amount consumed in the formation of the catalyst to form the complex with $BF_3$).

In general, from 1 to 30 mol % of the $BF_3$ source, based on the 2-alkylhydroxyaromatic compound, are used. In special cases, larger amounts such as 50 or 80 mol % may be used, for example in order to achieve higher reaction rates.

The process according to the invention may be carried out without solvent. However, preference is given to using a hydrocarbon such as an n-alkane or a mixture thereof as a solvent. Owing to their low reactivity with respect to the alkylation with polyisobutenes, alkylaromatics or mixtures thereof may also be used. In this context, aromatics such as toluene, ethylbenzene, o-xylene, m-xylene, p-xylene, the isomeric trimethylbenzenes or mixtures thereof (for example the mixtures purchased as "Aromatic 100" or "Aromatic 150" from Exxon Company) are used particularly advantageously. In these solvents, any further reaction in step b) may generally take place or the product may be brought to the market.

The conversion in step a) is preferably effected at a temperature in the range of at most 40° C., preferably of at most 30° C. This is true both for the contacting of the 2-alkylhydroxyaromatic compound with the $BF_3$ source and the alkylation with the polyisobutenes. The 2-alkylhydroxyaromatic compound may also be contacted with the $BF_3$ source at a lower temperature of at most 20° C., preferably of at most 10° C.

The reaction in step a) is typically carried out at atmospheric pressure, but may also be carried out at higher or lower pressures.

The sequence of addition of the reaction components is in principle unimportant. However, it has been found to be advantageous to initially charge the 2-alkylhydroxy-aromatic compound in substance or in solution, to add the $BF_3$ source as gaseous $BF_3$, as an adduct or as a mixture with an alcohol, as described above, and finally to add the polyisobutene, likewise in substance or in solution. The reaction may be terminated by means of an alkanol, for example methanol. For workup, washing may be effected with water, alkanols or water-alkanol mixtures, then the organic phase dried by customary processes, for example over sodium sulfate or magnesium sulfate, and the solvent removed.

The 2-alkylpolyisobutenylphenols obtained in step a) of the process according to the invention are suitable for a multitude of industrial applications and especially for stabilizing nonliving organic material against the action of light, oxygen and heat, as fuel additives, and also as intermediates for the preparation of fuel detergents. These fields of use will be considered in more detail hereinbelow for the inventive compositions.

The 2-alkylpolyisobutenylphenols obtained in step a) of the process according to the invention may be subjected to an aminoalkylation in step b) as a subsequent reaction. Suitable processes for preparing polyisobutenylphenol-containing Mannich adducts are known in principle to those skilled in the art and are described, for example, in EP-A-0 831 141, WO 01/25293 and WO 01/25294, which are fully incorporated herein by way of reference.

For the reaction in step b), preference is given to using the polyisobutene alkylation product of compounds of the general formula I where $R^1$ is a $C_1$-$C_{20}$-alkyl radical and $R^2$ is hydrogen. In a specific embodiment, the polyisobutene alkylation products of compounds of the general formula I are used where $R^1$ is a $C_1$-$C_{20}$-alkyl radical which has at least one tertiary or quaternary carbon atom.

For the aminoalkylation, the reaction product obtained under a) may be reacted under b) with an aldehyde, preferably formaldehyde or an oligomer or polymer thereof, and at least one amine which has at least one primary or at least one secondary amino function. Also possible is the reaction of the reaction product obtained under a) with an adduct of primary amines with formaldehyde, such as hexahydrotriazines, e.g. triphenylhexahydrotriazine. This reaction is also referred to hereinbelow as the Mannich reaction.

Preferred aldehydes are formaldehyde, formalin solutions, formaldehyde oligomers, e.g. trioxane, or polymers of formaldehyde such as paraformaldehyde. It will be appreciated that gaseous formaldehyde may also be used.

Suitable amines have at least one primary or secondary amino function. Primary amino functions in the context of this invention are amino functions of the formula $HNR^4R^5$ where one of the $R^4$ and $R^5$ radicals is a hydrogen atom and the other radical is selected from substituents other than hydrogen.

Secondary amino functions in the context of this invention are amino functions of the formula $HNR^4R^5$ where the $R^4$ and $R^5$ radicals are each selected from substituents other than hydrogen.

The $R^4$ and $R^5$ radicals are preferably selected from hydrogen, $C_1$-$C_{20}$-alkyl, $C_3$-$C_8$-cycloalkyl and $C_1$-$C_{20}$-alkoxy radicals which may be interrupted by heteroatoms selected from N and O, and/or substituted, in which case the heteroatoms may in turn bear substituents which are preferably selected from H, $C_1$-$C_6$-alkyl, aryl and heteroaryl; or $R^4$ and $R^5$ together with the nitrogen atom to which they are bonded form a 5- or 6-membered cycle which may have one or two heteroatoms selected from N and O and be substituted by one, two or three $C_1$-$C_6$-alkyl radicals. In addition, $R^4$ and $R^5$ may also be aryl and heteroaryl radicals. Aryl and heteroaryl radicals have, if appropriate, from one to three substituents selected, for example, from hydroxyl and the aforementioned alkyl, cycloalkyl or alkoxy radicals and polyisobutene radicals.

Suitable $R^4$, $R^5$ radicals are, for example, hydrogen, methyl, ethyl, n-propyl, sec-propyl, isopropyl, n-butyl, isobutyl, sec-butyl, tert-butyl, n-pentyl and n-hexyl, 5-, 6- and 7-membered saturated, unsaturated or aromatic carbo- and heterocycles such as cyclopentyl, cyclohexyl, phenyl, tolyl, xylyl, cycloheptanyl, naphthyl, tetrahydrofuranyl, tetrahydropyranyl, dioxanyl, pyrrolidyl, piperidyl, pyridyl and pyrimidyl.

Suitable compounds of the formula $HNR^4R^5$ which have exclusively a primary amino function are, for example, methylamine, ethylamine, n-propylamine, isopropylamine, n-butylamine, isobutylamine, sec-butylamine, tert-butylamine, pentylamine, hexylamine, cyclopentylamine, cyclohexylamine, aniline and benzylamine.

Suitable compounds of the formula $HNR^4R^5$ which have exclusively a primary amino function and in which the $R^4$ or $R^5$ radical is an alkyl radical which is interrupted by the O heteroatom and/or substituted are, for example, $CH_3$—O—$C_2H_4$—$NH_2$, $C_2H_5$—O—$C_2H_4$—$NH_2$, $CH_3$—O—$C_3H_6$—$NH_2$, $C_2H_5$—O—$C_3H_6$—$NH_2$, n-$C_4H_9$—O—$C_4H_8$—$NH_2$, HO—$C_2H_4$—$NH_2$, HO—$C_3H_7$—$NH_2$ and HO—$C_4H_8$—$NH_2$.

Suitable compounds of the formula $HNR^4R^5$ which have exclusively a secondary amino function are, for example, dimethylamine, diethylamine, methylethylamine, di-n-propylamine, diisopropylamine, diisobutylamine, di-sec-butylamine, di-tert-butylamine, dipentylamine, dihexylamine, dicyclopentylamine, dicyclohexylamine and diphenylamine.

Suitable compounds of the formula $HNR^4R^5$ which have exclusively a secondary amino function and in which the $R^4$ and $R^5$ radical are each alkyl radicals which are interrupted by the O heteroatom and/or substituted are, for example, ($CH_3$—O—$C_2H_4$)$_2$NH, ($C_2H_5$—O—$C_2H_4$)$_2$NH, ($CH_3$—O—$C_3H_6$)$_2$NH, ($C_2H_5$—O—$C_3H_6$)$_2$NH, (n-$C_4H_9$—O—$C_4H_8$)$_2$NH, (HO—$C_2H_4$)$_2$NH, (HO—$C_3H_6$)$_2$NH and (HO—$C_4H_8$)$_2$NH.

Suitable compounds of the formula $HNR^4R^5$ in which $R^4$ and $R^5$ together with the nitrogen atom to which they are bonded form a 5-, 6- or 7-membered cycle which has one or two heteroatoms selected from N and O and may be substituted by one, two or three $C_1$- to $C_6$-alkyl radicals are, for example, pyrrolidine, piperidine, morpholine and piperazine, and also their substituted derivatives such as N—$C_1$-$C_6$-alkylpiperazines and dimethylmorpholine.

Suitable compounds of the formula $HNR^4R^5$ which are interrupted by N and/or have substituted alkyl radicals are alkylenediamines, dialkylenetriamines, trialkylenetetramines and polyalkylene polyamines such as oligo- or polyalkylenimines, in particular oligo- or polyethylenimines, preferably oligoethylenimines, consisting of from 2 to 20, preferably from 2 to 10 and more preferably from 2 to 6, ethylenimine units. Suitable such compounds are in particular n-propylenediamine, 1,4-butanediamine, 1,6-hexanediamine, diethylenetriamine, triethylenetetramine and polyethylenimines, and also their alkylation products which have at least one primary or secondary amino function, for example 3-(dimethylamino)-n-propylamine, N,N-dimethylethylenediamine, N,N-diethylethylenediamine and N,N,N',N'-tetramethyldiethylenetriamine. Likewise suitable is ethylenediamine.

Further suitable compounds of the formula $HNR^4R^5$ are the reaction products of alkylene oxides, in particular ethylene oxide, with primary amines, and also copolymers of ethylene oxide with ethylenimine and/or primary or secondary $C_1$-$C_6$-alkylamines.

Preferred compounds of the formula $HNR^4R^5$ are 3-(dimethylamino)-n-propylamine, di[3-(dimethylamino)-n-propyl]amine, di[3-(diethylamino)-n-propyl]amine, di[2-(dimethylamino)ethyl]amine, dimethylamine, diethylamine, di-n-propylamine, diisopropylamine, dicyclohexylamine, pyrrolidine, piperidine, morpholine, dimethylmorpholine, N-methylpiperazine, HO—$C_2H_4$—$NH_2$, (HO—$C_2H_4$)$_2$NH, $H_3C$—O—($CH_2$)$_2$—$NH_2$, $H_3C$—O—($CH_2$)$_3$—$NH_2$, diethylenetriamine, triethylenetetramine, N, N-diethylethylenediamine, N,N,N',N'-tetramethyldiethylenetriamine and polyethylenimines.

Particularly preferred compounds of the formula $HNR^4R^5$ are 3-(dimethylamino)-n-propylamine, di[3-(dimethylamino)-n-propyl]amine, dimethylamine, diethylamine, ethylenediamine, diphenylamine and morpholine.

In the (Mannich) reaction, water of reaction is formed. In general, this is removed from the reaction mixture. The water of reaction may be removed during the reaction, at the end of the reaction time or on completion of reaction, for example by distillation. Advantageously, the water of reaction can be removed by heating the reaction mixture in the presence of azeotroping agents. Suitable azeotroping agents are, for example, organic solvents which form an azeotrope with water and/or have a boiling point above the boiling point of water.

Particularly suitable azeotroping agents are paraffins, benzene and alkylaromatics, in particular toluene, xylenes and mixtures of alkylaromatics with other (high-boiling) hydrocarbons. In general, the removal of the water of reaction is carried out at a temperature which corresponds approximately to the boiling point of the azeotroping agent or of the azeotrope of water and azeotroping agent.

Suitable temperatures for the removal of the water of reaction at atmospheric pressure are therefore in the range from 75 to 200° C., preferably from 80 to 180° C., and more preferably in the range from 80 to 150° C. When the water of reaction is removed at reduced pressure, the temperatures have to be reduced in accordance with the lowered boiling temperatures.

Suitable reaction temperatures for the Mannich reaction are preferably in the range from 10 to 200° C., in particular in the range from 20 to 180° C., for example about 35° C., about 90° C., about 120° C. or about 140° C.

In a preferred embodiment, the Mannich reaction and the removal of the water of reaction are carried out at about atmospheric pressure and a temperature of about 80° C., about 110° C. or about 130° C., with aromatic solvents, preferably toluene, xylenes or mixtures thereof, as azeotroping agents. The Mannich reaction is preferably carried out in such a way that the reactants are combined within a temperature range between 10 and 50° C., if appropriate mixed within this temperature range and subsequently brought to the temperature required for the distillative removal of the water of reaction.

In the Mannich reaction carried out under b), generally from 0.5 to 3.0 mol, preferably from 0.5 to 2.0 mol and in particular from 0.8 to 1.5 mol, of aldehyde, and also from 0.5 to 3.0 mol, preferably from 0.5 to 2.0 mol and in particular from 0.8 to 1.5 mol, of amine, are used based on 1 mol of 2-alkylpolyisobutenylphenol from a).

The process according to the invention is suitable firstly for alkylating phenols which bear a branched alkyl substituent in the 2-position and/or 6-position in very high yields, and also for preparing Mannich adducts thereof. The invention therefore further provides a composition comprising at least one 2-alkylpolyisobutenylphenol and/or at least one Mannich adduct thereof, obtainable by a process as described above. This is preferably a composition which is obtainable by alkylating at least one 2-alkylhydroxyaromatic compound of the general formula I where $R^1$ and/or $R^2$ are a $C_1$-C20-alkyl radical which has at least one tertiary or quaternary carbon atom. In particular, the composition according to the invention has at least 90% by weight, more preferably at least 95% by weight, of at least one 2-alkylpolyisobutenylphenol and/or at least one Mannich adduct thereof.

The 2-alkylpolyisobutenylphenols and their Mannich adducts obtainable by the process according to the invention, and also the inventive compositions, are suitable advantageously for stabilizing nonliving organic material against the action of light, oxygen and heat. For this use, preference is given to using 2-alkylpolyisobutenylphenols and Mannich adducts thereof which have a branched alkyl substituent in the 2-position and/or 6-position. These preferably include 2-isopropyl-4-polyisobutenylphenol, 2-(tert-butyl)-4-polyisobutenylphenol, 2,6-diisopropyl-4-polyisobutenylphenol and 2,6-di(tert-butyl)-4-polyisobutenylphenol, and their Mannich adducts.

The mechanical, chemical and/or esthetic properties of nonliving organic material, for example of plastics and paints, are known to be worsened by reaction of light, oxygen and heat. This worsening is typically manifested as yellowing, discoloration, crack formation or embrittlement of the material. Stabilizers or stabilizer compositions which comprise at least one 2-alkylpolyisobutenylphenol and/or Mannich adduct thereof achieve good protection against the impairment of organic material by light, oxygen and heat. This is especially true of 2-alkylpolyisobutenylphenols and Mannich adducts thereof which have a branched alkyl substituent in the 2-position and/or 6-position.

Components used are generally in the form of viscous liquids at room temperature and can therefore easily be incorporated into the material to be stabilized and homogeneously distributed.

The 2-alkylpolyisobutenylphenols and/or their Mannich adducts are generally added to the organic material to be stabilized in a concentration of from 0.005 to 5% by weight, preferably from 0.01 to 5% by weight, more preferably from 0.01 to 2% by weight, in particular from 0.05 to 1% by weight, based on the organic material, before, during or after its production.

Nonliving organic material refers, for example, to cosmetic preparations such as ointments and lotions, pharmaceutical formulations such as pills and suppositories, photographic recording materials, especially photographic emulsions, coating compositions and plastics. These also include mineral oils, for example diesel fuel, gasoline fuel, engine or lubricating oils, lubricating greases. Plastics which can be stabilized by the inventive stabilizers include:

polymers of mono- or diolefins, for example low- or high-density polyethylene, polypropylene, linear polybutene-1, polyisoprene, polybutadiene and also copolymers of mono- or diolefins or mixtures of the polymers mentioned;

polystyrene and also copolymers of styrene or a-methyl-styrene with dienes and/or acrylic derivatives, for example styrene-butadiene, styrene-acrylonitrile (SAN), styrene-ethyl methacrylate, styrene-butadiene-ethyl acrylate, styrene-acrylonitrile-methacrylate, acrylonitrile-butadiene-styrene (ABS) or methyl methacrylate-butadiene-styrene (MBS); halogenated polymers, for example polyvinyl chloride, polyvinyl fluoride, polyvinylidene fluoride and also copolymers thereof;

polymers which are derived from $\alpha,\beta$-unsaturated acids and their derivatives, such as polyacrylates, polymethacrylates, polyacrylamides and polyacrylonitriles;

polymers which are derived from unsaturated alcohols and amines or from their acyl derivatives or acetals, for example polyvinyl alcohol and polyvinyl acetate;

polyurethanes, polyamides, polyureas, polyphenylene ethers, polyesters, polycarbonates, polysulfones, polyether sulfones and polyether ketones.

The coating compositions which can be stabilized with the inventive stabilizers include coatings such as alkyd resin coatings, dispersion coatings, epoxy resin coatings, polyurethane coatings, acrylic resin coatings, cellulose nitrate coatings, or varnishes such as wood protection varnishes.

The inventive stabilizers are particularly suitable for stabilizing polyurethanes, especially thermoplastic polyurethanes. The 2-alkylpolyisobutenylphenols obtainable by step a) of the process according to the invention, and also the inventive compositions, are advantageously suitable as fuel additives and for producing fuel detergents. The Mannich adducts of a 2-alkylpolyisobutenylphenol obtainable by step b) of the process according to the invention and their compositions are advantageously suitable as a detergent additive in fuel and lubricant compositions.

The invention further provides a fuel composition comprising a majority of a liquid hydrocarbon fuel and also at least one 2-alkylpolyisobutenylphenol and/or a Mannich adduct thereof.

The 2-alkylpolyisobutenylphenols obtainable in accordance with the invention and their Mannich adducts are added to the fuels, which are preferably selected from gasoline fuels and diesel fuels and especially from gasoline fuels, in a concentration of preferably from 0.1 to 40 000 ppm by weight. The use of the inventive 2-alkylpolyisobutenylphenols and their Mannich adducts in fuels and especially in gasoline fuels leads to an improvement in the properties of the motor oil (lubricating oil), into which they pass during engine operation, of internal combustion engines. In particular, they improve the stabilizing (in particular the antioxidant) and frictional wear-reducing properties of the motor oil, and also its viscosity. Moreover, they may lead to reduced fuel consumption. Suitably, the procedure in the case of use of the inventive 2-alkylpolyisobutenylphenols and their Mannich adducts in fuels for improving the properties of the motor oil (lubricating oil) of internal combustion engines is analogous to prior art processes, as described, for example, in WO 03/091365 or WO 94/22988, whose contents are fully incorporated by way of reference.

The invention further provides a lubricant composition comprising a majority of a liquid, semisolid or solid lubricant, and also a detergency-active amount of at least one 2-alkylpolyisobutenylphenol and/or a Mannich adduct thereof.

The above-described inventive compositions are suitable advantageously for improving the thermal stability and/or for reducing deposits in the fuel circuit and combustion system of turbines, as are used, for example, as aircraft engines. The invention therefore further provides a turbine fuel composition which comprises a turbine fuel (jet fuel) and a composition as described above.

The turbine fuel composition comprises a majority of a liquid turbine fuel which may, for example, be a turbine fuel customary in civilian or military aviation. Examples include fuels of designation Jet Fuel A, Jet Fuel A-1, Jet Fuel B, JP-4, JP-5, JP-7, JP-8 and JP-8+100. Jet A and Jet A-1 are commercially available turbine fuel specifications based on kerosene. The accompanying standards are ASTM D 1655 and DEF STAN 91-91. Jet B is a narrower-cut fuel based on naphtha and kerosene fractions. JP-4 is equivalent to Jet B. JP-5, JP-7, JP-8 and JP-8+100 are military turbine fuels, as are used, for example, by the marines and air force. Some of these standards designate formulations which already comprise further additives such as corrosion inhibitors, icing inhibitors, static dissipaters, etc.

The inventive 2-alkylpolyisobutenylphenols and/or their Mannich adducts may be added to the turbine fuel compositions individually, as a mixture and, if appropriate, in combination with further additives known per se.

Suitable additives which may be used in the inventive turbine fuel compositions comprise detergents, corrosion inhibitors, antioxidants such as sterically hindered tertbutylphenols or N-butylphenylenediamines, metal deactivators such as N,N'-disalicylidene-1,2-diaminopropane, solubilizers, antistats such as Stadis 450, biocides, anti-icing agents such as diethylene glycol methyl ether, and mixtures thereof.

Preferred additives a) are succinic anhydride derived compounds with long-chain hydrocarbon radicals. These may have further functional groups which are preferably selected from hydroxyl, amino, amido and/or imido groups. Preferred additives are the corresponding derivatives of polyalkenylsuccinic anhydride which are obtainable, for example, by reacting polyalkenes with maleic anhydride by a thermal route or via the chlorinated hydrocarbons. The number-average molecular weight of the long-chain hydrocarbon radicals is preferably within a range from about 200 to 10 000, more preferably from 400 to 5000, in particular from 600 to 3000 and especially from 650 to 2000. These long-chain hydrocarbon radicals preferably derive from conventional polyisobutenes and especially from the aforementioned reactive polyisobutenes. Of particular interest as additives a) are the derivatives of polyalkenylsuccinic anhydrides with ammonia, monoamines, polyamines, monoalcohols and polyols. Polyamines preferred for derivatization comprise ethylenediamine, diethylenetriamine, triethylenetetramine, tetraethylenepentamine, propylenediamine, etc. Suitable alcohols comprise monohydric alcohols such as ethanol, allyl alcohol, dodecanol and benzyl alcohol, polyhydric alcohols such as ethylene glycol, diethylene glycol, propylene glycol, 1,2-butanediol, neopentyl glycol, glycerol, trimethylolpropane, erythritol, pentaerythritol, mannitol and sorbitol.

Succinic anhydride derivatives a) suitable as additives are described, for example, in U.S. Pat. No. 3,522,179, U.S. Pat. No. 4,234,435, U.S. Pat. No. 4,849,572, U.S. Pat. No. 4,904,401, U.S. Pat. No. 5,569,644 and U.S. Pat. No. 6,165,235, which are incorporated here fully by reference.

Suitable additives b) are polyalkenylthiophosphonate esters. The polyalkenyl radical of these esters preferably has a number-average molecular weight in the range from about 300 to 5000, more preferably from 400 to 2000 and especially from 500 to 1500. The polyalkenyl radical derives preferably from polyolefins as have already been described as a long-chain hydrocarbon radical for component a). They are especially polyalkenyl radicals which derive from conventional or reactive polyisobutenes. Suitable processes for preparing suitable polyalkenylthiophosphonate esters by reacting a polyolefin with a thiophosphorylating agent are described in U.S. Pat. No. 5,725,611, which is incorporated here by reference.

Suitable additives c) are Mannich adducts which are different from the inventive Mannich adducts. Such adducts are obtained in principle by Mannich reaction of aromatic hydroxyl compounds, especially phenol and phenol derivatives, with aldehydes and mono- or polyamines. They are preferably the reaction products of polyisobutene-substituted phenols with formaldehyde and mono- or polyamines such as ethylenediamine, diethylenetriamine, triethylenetetramine, tetraethylenepentamine, dimethylaminopropylamine, etc. Suitable Mannich adducts and processes for their preparation are described, for example, in U.S. Pat. No. 5,876,468, EP-A-831 141, EP-A-1 233 990 and EP-A-1 226 188, which are fully incorporated here by reference.

The inventive turbine fuel composition comprises at least one 2-alkylpolyisobutenylphenol and/or a Mannich adduct thereof, as described above, in an amount of from 0.0001 to 1% by weight, more preferably from 0.001 to 0.5% by weight, in particular from 0.01 to 0.2% by weight and especially from 0.01 to 0.1% by weight, based on the total amount of the turbine fuel composition.

The additional components a) to c) and also further aforementioned additional components may typically each be used in amounts of from 0.0001 to 1% by weight, preferably from 0.001 to 0.6% by weight and in particular from 0.0015 to 0.4% by weight, based on the total amount of the turbine fuel composition.

The application further provides an additive concentrate for turbine fuels, comprising at least one 2-alkylpolyisobutenylphenol and/or Mannich adduct thereof, as described above, if appropriate at least one diluent and also, if appropriate, at least one further additive which is selected from those described above.

Suitable diluents are, for example, fractions obtained in mineral oil processing, such as kerosene, naphtha or brightstock. Also suitable are aromatic and aliphatic hydrocarbons such as Solvent Naphtha heavy, Solvesso® or Shellsol®, and also mixtures of these solvents and diluents.

The inventive polymer is present in the concentrates preferably in an amount of from 0.1 to 100% by weight, more preferably from 1 to 80% by weight and in particular from 10 to 70% by weight, based on the total weight of the concentrate.

The inventive 2-alkylpolyisobutenylphenols and their Mannich adducts are suitable advantageously for improving the thermal stability of turbine fuels. They are also suitable for reducing deposits in the fuel circuit and in the combustion system of turbines, especially aviation turbines. The invention therefore further provides for the use of at least one inventive 2-alkylpolyisobutenylphenol and/or of a Mannich adduct thereof for these fields of use.

The invention further provides a lubricant composition comprising a majority of a liquid, semisolid or solid lubricant, and also a detergency-active amount of at least one 2-alkylpolyisobutenylphenol and/or a Mannich adduct thereof.

The invention is illustrated in detail with reference to the nonlimiting examples which follow.

EXAMPLE

Comparative Example 1)

Alkylation using $BF_3$-phenol complex as a catalyst

In a 2 l four-neck flask which is equipped with stirrer, thermometer and dropping funnel, 65 g of o-cresol are dissolved in 20 ml of toluene. Then, 11.8 g of $BF_3$-phenol complex (1:2, mol:mol) are added and 300 g of polyisobutene ($M_n$=1000 dalton, $M_w/M_n$=1.6; Glissopal® 1000) in 300 ml of n-hexane are added dropwise at from 20 to 30° C. and stirred for a further 16 h. The reaction mixture is washed once with 25% ammonia solution and five times with 500 ml of water, dried over $Na_2SO_4$ and concentrated on a rotary evaporator at 160° C./5 mbar.

325 g of oil, according to $^1H$ NMR$^{a)}$

2-Methyl-4-polyisobutenylphenol (δ: 6.66 ppm doublet, 7.04 ppm doublet of doublets, 7.09 ppm doublet, each 1H; 2.24 ppm singlet 3H) and 10 mol % of 4-polyisobutenylphenol (6.73 ppm doublet, 7.22 ppm doublet, each 2H)

Comparative Example 2)

Alkylation using $BF_3$-diethyl ether complex as a catalyst

In a 1 l four-neck flask which is equipped with stirrer, thermometer and dropping funnel, 60 g of 2-tert-butylphenol are dissolved in 14 ml of $BF_3$ etherate. 200 g of polyisobutene ($M_n$=1000 dalton, $M_w/M_n$=1.6; Glissopal® 1000) in 200 ml of n-hexane are then added dropwise at from 19 to 23° C. and stirred for a further 16 h. The reaction mixture is washed three times with 500 ml of methanol and concentrated on a rotary evaporator at 140° C./5 mbar.

180 g of oil, according to $^1H$ NMR$^{a)}$ (in mol %):

17% of 2-tert-butyl-4-polyisobutenylphenol (δ: 6.57 ppm doublet, 7.15 ppm doublet of doublets, 7.26 ppm doublet, each 1H; 1.40 ppm 9H) and 7% of 4-polyisobutenylphenol (δ: 6.73 ppm doublet, 7.22 ppm doublet, each 2H) 76% of polyisobutene having rearranged double bond

Comparative Example 3)

Alkylation using $CF_3$—$SO_3H$ as a catalyst

In a 1 l four-neck flask which is equipped with stirrer, thermometer and dropping funnel, 41.2 g of 2-tert-butylphenol are dissolved in 10 ml of toluene. 5 g of $CF_3$—$SO_3H$ are then added and 200 g of polyisobutene ($M_n$=1000 dalton, $M_w/M_n$=1.6; Glissopal®) 1000) in 100 ml of n-hexane are added dropwise at from 19 to 25° C. and stirred for a further 16 h. The reaction mixture is washed once with 5% ammonia solution and three times with 500 ml of methanol, and concentrated on a rotary evaporator at 120° C./5 mbar.

200 g of oil, according to 1H NMR$^{a)}$ (in mol %):

20% of aromatics mixture, no individual isomers recognizable

80% of polyisobutene having rearranged double bond

Example 4 (Inventive)

In a 4 l four-neck flask which is equipped with stirrer, thermometer and dropping funnel, 300 g of 2-tert-butylphenol are dissolved in 200 ml of toluene. 3.5 g of $BF_3$ are then injected at from 0 to 5° C. and 1000 9 of polyisobutene ($M_n$=1000 dalton, $M_w/M_n$=1.6; Glissopal® 1000) in 400 ml of n-hexane are added dropwise at from 0 to 10° C. and stirred for a further 2 h. The reaction is terminated using 200 ml of methanol and washed twice with 1.5 l of methanol, and concentrated on a rotary evaporator at 160° C./5 mbar.

970 g of oil, according to $^1H$ NMR$^{a)}$ (in % by weight):

>95% of 2-tert-butyl-4-polyisobutenylphenol (δ: 6.57 ppm doublet, 7.15 ppm doublet of doublets, 7.26 ppm doublet, each 1H; 1.40 ppm 9H) and additionally small amounts of 2-tert-butylphenol

Example 5 (Inventive)

In a 4 l four-neck flask which is equipped with stirrer, thermometer and dropping funnel, 300 g of 2-tert-butylphenol are dissolved in 200 ml of toluene. 10 g of 1:1.1 $BF_3$/MeOH complex are then added dropwise at from 0 to 5° C. and 1000 g of polyisobutene ($M_n$=1000 daltons, $M_w/M_n$=1.6; Glissopal® 1000) in 400 ml of n-hexane are subsequently added dropwise at from 0 to 10° C. and stirred for a further 2 h. The reaction is terminated using 200 ml of methanol and washed twice with 1 l of methanol, and concentrated on a rotary evaporator up to 160° C./5 mbar.

958 g of oil, according to $^1H$-NMR$^a$ (in % by weight)

approx. 95% of 2-tert-butyl-4-polyisobutenylphenol (δ: 6.57 ppm doublet, 7.15 ppm doublet of doublets, 7.26 ppm doublet, each 1H; 1.40 ppm 9H) and additionally small amounts of 2-tert-butylphenol.

Example 6 (Inventive)

In a 4 l four-neck flask which is equipped with stirrer, thermometer and dropping funnel, 324 g of 2-methylphenol are initially charged in 100 ml of toluene. At room temperature, 8.5 g of $BF_3$ are then injected and 1500 g of polyisobutene ($M_n$=1000 dalton, $M_w/M_n$=1.6; Glissopal® 1000) in 200 ml of n-hexane are subsequently added, in the course of which the internal temperature rises up to 30° C. The mixture is stirred at room temperature overnight. The reaction is terminated using 500 ml of methanol and washed with 1 l of methanol, and concentrated on a rotary evaporator at 150° C./5 mbar.

1530 g of oil, according to $^1H$ NMR$^{a)}$ (in % by weight):

>95% of 2-methyl-4-polyisobutenylphenol (δ: 6.66 ppm doublet, 7.04 ppm doublet of doublets, 7.09 ppm doublet, each 1H, 2.24 ppm singlet 3H) and additionally small amounts of 2-methylphenol

Example 7 (Inventive)

In a 4 l four-neck flask which is equipped with stirrer, thermometer and dropping funnel, 272 g of 2-isopropylphenol are initially charged in 100 ml of toluene. At from 0 to 5° C., 10 g of $BF_3$ are then injected and 1000 g of polyisobutene ($M_n$=1000 dalton, $M_w/M_n$=1.6; Glissopal® 1000) in 400 ml of n-hexane are subsequently added, in the course of which the internal temperature rises up to 10° C. The mixture is stirred at room temperature overnight. The reaction is terminated using 500 ml of methanol and washed twice with 1 l of methanol, and concentrated on a rotary evaporator at 150° C./5 mbar.

950 g of oil, according to $^1H$ NMR$^{a)}$ (in % by weight):

>95% of 2-isopropyl-4-polyisobutenyphenol (δ: 6.64 ppm doublet, 7.01 ppm doublet of doublets, 7.18 ppm doublet, 3.19 ppm heptet, each 1H, 1.24 ppm doublet, 6H) and additionally small amounts of 2-isopropylphenol

Example 8 (Aminoalkylation According to Mannich)

In a 0.5 l four-neck flask which is equipped with stirrer, thermometer and dropping funnel and water separator, 100 g of 2-tert-butyl-4-polyisobutenylphenol (from Example 4) are dissolved in 100 ml of xylene. 12 g of 30% formaldehyde solution are then added and 13.5 g of 40% dimethylamine solution are added dropwise. Water is separated under vigorous stirring until clear xylene distills over. The solution is concentrated at 140° C., 5 mbar on a rotary evaporator.

105 g of oil, according to $^1$H NMR$^{b)}$ 2-tert-Butyl-4-polyisobutenyl-6-(N,N-dimethylamino) methylphenol (δ: 7.15 ppm doublet, 6.79 ppm doublet, each 1H, 3.58 ppm Singlet, 2H)

In a similar manner to Example 8, the following are prepared:

Example 22 (Testing of Thermal Stability)

The same fuel as in Example 20 was used. The additization was again effected with 100 mg/l of a composition according to Example 8. In a 3-neck glass flask which had been equipped with stirrer, reflux condenser and thermometer, 5 l of air were initially passed through 150 ml of the fuel to be investigated at room temperature within 1 h. Subsequently, the fuel was heated to 140° C. with an oil bath and stirred at this temperature for a further 5 h. After cooling to room temperature, the entire amount of fuel was filtered through a 0.45 μm membrane filter. Subsequently, the filter residue,

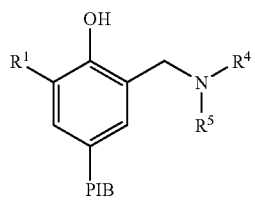

| Ex. No. | $M_n$ (PIB) dalton | $R^1$ | $R^4 = R^5$ | $\delta_{aromat1}$ ppm | $\delta_{aromat2}$ ppm | $\delta_{benzyl}$ ppm |
|---|---|---|---|---|---|---|
| 9 | 1000 | CH$_3$ | —CH$_2$—CH(C$_2$H$_5$)—C$_4$H$_9$ | 6.99 | 6.79 | 3.58 |
| 10 | 1000 | CH$_3$ | —C$_2$H$_4$—OH | 7.09 | 7.03 | 3.82 |
| 11 | 1000 | i-C$_3$H$_7$ | —CH$_2$—CH(C$_2$H$_5$)—C$_4$H$_9$ | 7.06 | 6.78 | 3.58 |
| 12 | 1000 | i-C$_3$H$_7$ | CH$_3$ | 7.07 | 6.77 | 3.58 |
| 13 | 1000 | i-C$_3$H$_7$ | —C$_2$H$_4$—OH | 7.10 | 6.81 | 4.63 |
| 14 | 1000 | tert-C$_4$H$_9$ | CH$_3$ | 7.15 | 6.78 | 3.58 |
| 15 | 1000 | tert-C$_4$H$_9$ | —C$_2$H$_4$—OH | 7.19 | 6.83 | 3.83 |
| 16 | 1000 | tert-C$_4$H$_9$ | C$_5$H$_6$ | 7.12 | 6.3 | 4.60 |
| 17 | 1800 | tert-C$_4$H$_9$ | CH$_3$ | 7.15 | 6.78 | 3.58 |
| 18 | 800 | tert-C$_4$H$_9$ | CH$_3$ | 7.15 | 6.78 | 3.58 |
| 19 | 300 | tert-C$_4$H$_9$ | CH$_3$ | 7.16 | 6.79 | 3.58 |

Example 20

In a 0.5 l four-neck flask which is equipped with stirrer, thermometer and reflux condenser, 100 g of 2-methyl-4-polyisobutenylphenol (from Example 6) are dissolved in 100 ml of xylene. 15 g of triphenylhexahydrotriazine are then added and the mixture is boiled under vigorous reflux for 1 h. The solution becomes clear. The solution is concentrated on a rotary evaporator at 160° C., 3 mbar.

108 g of oil, according to $^1$H NMR$^{b)}$

2-Methyl-4-polyisobutenyl-6-(N-phenylamino)methylphenol (δ: 6.97 ppm doublet, 6.84 ppm doublet, each 1H, 4.58 ppm Singlet 2H)

All NMR: 16 scans, 400 MHz, CD$_2$Cl$_2$ $^{a)}$: The shifts of the aromatic protons and of the 2-alkyl group are reported $^{b)}$: The shifts of the aromatic protons and of the benzyl group are reported

Example 21 (Improvement in the Thermal Stability of Turbine Fuels (Jet Fuels))

A turbine fuel of the Jet A-1 specification to DEF STAN 91-91 or ASTM D 1655 was used. The thermal stability was tested according to the JFTOT breakpoint method to ASTM D 3241. For the unadditized turbine fuel, a value of 250° C. was determined. A fuel which had been additized with 100 mg/l of an inventive Mannich adduct according to Example 8 gave a measurement of 270° C.

after drying in a drying cabinet at 115° C. for 45 min and subsequently drying under reduced pressure in a desiccator for two hours, was determined gravimetrically.

Blank value (without additive): 4.4 mg

Inventive (additized with 100 mg/l of Ex. 8): 2.6 mg

The use of the inventive additive distinctly reduced the amount of particles formed by thermal stress on the turbine fuel.

What invention claimed is:

1. A process for preparing 2-alkylpolyisobutenylphenols and their Mannich adducts, by a) contacting at least one 2-alkylhydroxyaromatic compound with a catalytically active amount of a BF$_3$ source which is capable of complex formation with the 2-alkylhydroxyaromatic compound, and alkylating with substantially monoethylenically unsaturated and substantially homopolymeric polyisobutenes having a number average molecular weight M$_n$ of from 150 to 500000 and comprising at least 50 mol %, based on the total number of polyisobutene macromolecules, of terminal double bonds, wherein said BF$_3$ source is at least one member selected from the group consisting of gaseous BF$_3$; a BF$_3$ complex with at least one of the 2-alkylhydroxyaromatic compounds of said a) contacting; a BF$_3$ complex with a hydroxyaromatic compound which are substantially not alkylated under the reaction conditions of said a) contacting; and a mixture of BF$_3$ with an alcohol which comprises less than 2 mol of alcohol per mol of BF$_3$, and b) optionally, subjecting the 2-alkylpolyisobutenylphenols obtained in said a) contacting to an aminoalkylation wherein the alkylating is carried out in the absence of any $BF_3$ complex of any of an aliphatic ether, a dicycloalkylether, tetrahydrofuran, a phenol, an arylalkyl ether or a $BF_3$ complex with an aliphatic alcohol that comprises two or more mols of alcohol per mol of $BF_3$.

2. The process according to claim 1, wherein the $BF_3$ source is a complex of one or more of 2,4,6-trialkylphenols and 4-halophenols.

3. The process according to claim 1, wherein the $BF_3$ source is a $BF_3$: alcohol mixture having a molar ratio of alcohol to $BF_3$ of at most 1.9:1.

4. The process according to claim 1, wherein the 2-alkylhydroxyaromatic compound is contacted with the $BF_3$ source and alkylated with the polyisobutenes at a temperature of at most 40° C.

5. The process according to claim 1, wherein the 2-alkylhydroxyaromatic compound is contacted with the $BF_3$ source at a temperature of at most 20° C.

6. The process according to claim 1, wherein the 2-alkylhydroxyaromatic compound is a compound of formula I

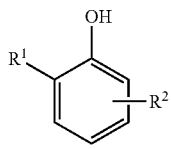
(I)

where $R^1$ is $C_1$-$C_{20}$-alkyl and $R^2$ is hydrogen, $C_1$-$C_{20}$-alkyl, hydroxyl or $C_2$-$C_{4000}$-alkyl which is interrupted by at least one moiety which is selected from O, S and $NR^3$ where $R^3$ is hydrogen, alkyl, cycloalkyl or aryl.

7. The process according to claim 6, wherein $R^1$ and/or $R^2$ are each a $C_1$-$C_{20}$-alkyl radical which has at least one tertiary or quaternary carbon atom.

8. The process according to claim 6, wherein $R^1$ is a $C_1$-$C_{20}$-alkyl radical and $R^2$ is hydrogen, and the 2-alkylpolyisobutenylphenols obtained in step a) are subjected to an aminoalkylation in step b).

9. The process according to claim 6, wherein $R^2$ is a radical other than hydrogen which is bonded to the benzene ring in the 6-position.

10. The process according to claim 1, wherein the $BF_3$ source is not a $BF_3$ complex with any of an aliphatic ether, a dicycloalkyl ether, tetrahydrofuran, phenol, an arylalkyl ether or a $BF_3$ complex with an aliphatic alcohol that comprises two or more mols of alcohol per mol of $BF_3$.

11. The process according to claim 1, further comprising:
aminoalkylating the 2-alkylpolyisobutenylphenol obtained in said a) contacting.

* * * * *